US008462273B2

(12) United States Patent
Kumamoto

(10) Patent No.: US 8,462,273 B2
(45) Date of Patent: Jun. 11, 2013

(54) IMAGE DISPLAY DEVICE, PROJECTOR, CONTROL METHOD AND COMPUTER PROGRAM PRODUCT

(75) Inventor: Osamu Kumamoto, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 514 days.

(21) Appl. No.: 12/540,464

(22) Filed: Aug. 13, 2009

(65) Prior Publication Data

US 2010/0053438 A1 Mar. 4, 2010

(30) Foreign Application Priority Data

Aug. 26, 2008 (JP) .................................. 2008-216259

(51) Int. Cl.
H04N 5/50 (2006.01)
H04N 5/445 (2006.01)
H04N 5/64 (2006.01)
H04N 9/31 (2006.01)
G06F 3/038 (2006.01)
G09G 5/00 (2006.01)

(52) U.S. Cl.
USPC ........... 348/569; 348/564; 348/744; 345/204; 345/212; 345/661

(58) Field of Classification Search
None
See application file for complete search history.

(56) References Cited

U.S. PATENT DOCUMENTS

| 6,885,407 | B1 * | 4/2005 | Lee | 348/569 |
| 7,046,303 | B2 | 5/2006 | Idegata | |
| 2001/0043284 | A1 * | 11/2001 | Idegata | 348/564 |
| 2002/0060676 | A1 * | 5/2002 | Kim | 345/212 |
| 2004/0051705 | A1 * | 3/2004 | Lee | 345/204 |
| 2005/0185095 | A1 * | 8/2005 | Hsieh | 348/569 |
| 2007/0052733 | A1 * | 3/2007 | Hirabayashi et al. | 345/661 |

FOREIGN PATENT DOCUMENTS

| JP | 2001-333340 A | 11/2001 |
| JP | 2007-74347 A | 3/2007 |
| JP | 2008-102328 A | 5/2008 |

* cited by examiner

Primary Examiner — Jefferey Harold
Assistant Examiner — Sean Haiem
(74) Attorney, Agent, or Firm — ALG Intellectual Property, LLC

(57) ABSTRACT

The image display device and the like may generate an OSD image with the contents at the time of temporary non-display instruction when there is a redisplay instruction after temporary non-display instruction of a normal OSD image. As a result, the user can perform adjustment and the like of an image using an OSD image more efficiently. Since the image display device and the like generate a second OSD image showing temporary non-display at the time of temporary non-display of a normal OSD image, the user can see that the normal OSD image is in a temporary non-display state. In addition, since the size of the second OSD image is small, almost the entire original image can be checked.

15 Claims, 10 Drawing Sheets

IMAGE DISPLAY DEVICE, PROJECTOR, CONTROL METHOD AND COMPUTER PROGRAM PRODUCT

CROSS-REFERENCE

The present application claims priority from Japanese Patent Application No. 2008-216259 filed on Aug. 26, 2008, which is hereby incorporated by reference in its entirety.

BACKGROUND

In the case of a projector, a top image of a preference menu is displayed when a user presses a 'menu' button of a remote controller, and a submenu image for item selection is selected when the user presses an arrow key of the remote controller in a state where the top image is displayed. In addition, when the user presses an arrow key of the remote controller in a state where an item (for example, a color mode, brightness, or contrast) is selected, set contents of the item are changed.

Furthermore, as disclosed in Japanese Patent Publication No. 2007-74347, a preference menu is displayed as an OSD (On Screen Display) image so as to overlap on an original image. Moreover, the OSD image is removed from the screen by pressing a 'menu' button of the remote controller, and a top image is displayed again by pressing the 'menu' button again.

When an image before change and an image after change are displayed side by side for comparison or an OSD image is displayed to overlap on an original image as disclosed in Japanese Patent Publication No. 2007-74347, a part of the original image becomes invisible. As a result, the user cannot check the entire original image. When the user wants to check the entire original image in a state where the OSD image is displayed, the user removes the OSD image from the screen by pressing the 'menu' button. However, in order to perform readjustment and the like of an image, the user should display the top image of the preference menu by pressing the 'menu' button again and then perform an operation of selecting a desired item. Accordingly, it took time and effort to perform readjustment and the like of an image.

SUMMARY

Various embodiments may provide an image display device, a projector, a computer program product capable of performing adjustment and the like of an image more efficiently while allowing a user to check the almost entire original image when performing adjustment and the like of an image using an OSD image.

An image display device according to at least one embodiment of the disclosure includes: an operation information input unit that inputs operation information; an image generating unit that generates an original image on the basis of image information; an OSD image generating unit that generates a first OSD image with contents corresponding to the operation information on the basis of OSD image data and the operation information and that generates a second OSD image which is smaller than the first OSD image and shows a temporary non-display state of the first OSD image when operation information indicating a temporary non-display instruction of the first OSD image is input; a mixed image generating unit that generates a mixed image in which the original image and the first or second OSD image are mixed; and an image display unit that displays the mixed image. The OSD image generating unit generates the second OSD image instead of the first OSD image when the operation information indicating the temporary non-display instruction of the first OSD image is input and generates the first OSD image with contents at the time of the temporary non-display instruction, instead of the second OSD image, when operation information indicating a redisplay instruction of the first OSD image is input.

Furthermore, a projector according to at least one embodiment of the disclosure functions as the image display device described above.

Furthermore, a computer program product according to at least one embodiment of the disclosure causes a computer, which controls an operation information input unit that inputs operation information and an image display unit, to function as: an image generating unit that generates an original image on the basis of image information; an OSD image generating unit that generates a first OSD image with contents corresponding to the operation information on the basis of OSD image data and the operation information and that generates a second OSD image which is smaller than the first OSD image and shows a temporary non-display state of the first OSD image when operation information indicating a temporary non-display instruction of the first OSD image is input; a mixed image generating unit that generates a mixed image in which the original image and the first or second OSD image are mixed; and an image display control unit that displays the mixed image on the image display unit. The OSD image generating unit generates the second OSD image instead of the first OSD image when the operation information indicating the temporary non-display instruction of the first OSD image is input and generates the first OSD image with contents at the time of the temporary non-display instruction instead of the second OSD image when operation information indicating a redisplay instruction of the first OSD image is input.

According to the embodiment, the image display device and the like may generate an OSD image with the contents at the time of temporary non-display instruction when there is a redisplay instruction after temporary non-display instruction of a normal OSD image. As a result, the user can perform adjustment and the like of an image using an OSD image more efficiently.

Moreover, according to the embodiment, since the image display device and the like generate a second OSD image showing temporary non-display at the time of temporary non-display of a normal OSD image, the user can see that the normal OSD image is in a temporary non-display state. In addition, since the size of the second OSD image is small, almost the entire original image can be checked.

Furthermore, an image display according to one embodiment of the disclosure includes: an operation information input unit that inputs operation information; an image generating unit that generates an original image on the basis of image information; an OSD image generating unit that generates a first OSD image with contents corresponding to the operation information on the basis of OSD image data and the operation information; a mixed image generating unit that generates a mixed image by mixing the original image with the first OSD image; an image selection unit that selects the original image or the mixed image; an image display unit that displays the image selected by the image selection unit; and a display control unit that makes the image selection unit select the original image or the mixed image on the basis of the operation information. The display control unit makes the image selection unit select the original image instead of the mixed image when operation information indicating a temporary non-display instruction of the first OSD image is input in a state where the mixed image is displayed and makes the image selection unit select the mixed image instead of the original image when operation information indicating a redisplay instruction of the first OSD image is input in a state where the original image is displayed. At the time of redisplay instruction of the first OSD image, the OSD image generating unit generates the first OSD image with contents at the time of temporary non-display instruction of the first OSD image.

Furthermore, a projector according to one embodiment of the disclosure functions as the image display device described above.

Furthermore, a computer program product according to one embodiment of the disclosure causes a computer, which controls an operation information input unit that inputs operation information and an image display unit, to function as: an image generating unit that generates an original image on the basis of image information; an OSD image generating unit that generates an OSD image with contents corresponding to the operation information on the basis of OSD image data and the operation information; a mixed image generating unit that generates a mixed image by mixing the original image with the OSD image; an image selection unit that selects the original image or the mixed image; an image display control unit that displays the image selected by the image selection unit on the image display unit; and a display control unit that makes the image selection unit select the original image or the mixed image on the basis of the operation information. The display control unit makes the image selection unit select the original image instead of the mixed image when operation information indicating a temporary non-display instruction of the OSD image is input in a state where the mixed image is displayed and makes the image selection unit select the mixed image instead of the original image when operation information indicating a redisplay instruction of the OSD image is input in a state where the original image is displayed. At the time of redisplay instruction of the OSD image, the OSD image generating unit generates the OSD image with contents at the time of temporary non-display instruction of the OSD image.

According to the embodiment, the image display device and the like may generate an OSD image with the contents at the time of temporary non-display instruction when there is a redisplay instruction after temporary non-display instruction of a normal OSD image. As a result, the user can perform adjustment and the like of an image using an OSD image more efficiently.

In addition, according to the embodiment, the image display device and the like do not display the normal OSD image at the time of temporary non-display of the normal OSD image, so that the user can check the entire original image.

Moreover, the first OSD image may be an image in which at least one item is selectable from a plurality of items. When the operation information indicates selection of an item, the OSD image generating unit may generate the first OSD image with a state where at least the one item is selected according to the selection. At the time of the redisplay instruction, the OSD image generating unit may generate the first OSD image with a state where a selected item at the time of the temporary non-display instruction is selected.

In this case, at the time of redisplay instruction of a normal OSD image, the user can perform adjustment and the like of an image using an OSD image with a state where a selected item at the time of temporary non-display instruction is selected. As a result, the user can perform adjustment and the like of an image more efficiently.

Moreover, the OSD image generating unit may generate the first OSD image with a state where a first item is selected when operation information indicating a display end instruction of the first OSD image is input in a state where the mixed image is displayed.

In this case, when an instruction to end the display of a normal OSD image was made, the user can perform adjustment and the like of an image using an OSD image with a state where a first item is selected. As a result, the user can perform adjustment and the like of an image more efficiently.

Moreover, the image display device may further include an update unit that updates adjustment value data indicating an adjustment value of an image on the basis of the operation information. An item regarding adjustment of an image may be included in a plurality of items of the OSD image. The image generating unit may generate the original image adjusted on the basis of the adjustment value data.

In this case, when the user adjusts an image, the user can adjust an image while checking an original image on which the adjustment is reflected.

Moreover, the OSD image generating unit may determine a display position of the first OSD image on the basis of operation information indicating a display instruction position of the first OSD image, and may determine a display position at the time of the temporary non-display instruction as the display position of the first OSD image at the time of the redisplay instruction.

In this case, when the user performs redisplay of the normal OSD image in order to perform adjustment and the like of the image, the user can display the normal OSD image at the same position as that at the time of temporary non-display. As a result, the user can perform adjustment and the like of the image efficiently.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Hereinafter, embodiments of the invention applied to a projector will be described with reference to the accompanying drawings. In addition, the embodiments shown below do not limit the contents of the invention described in the appended claims. In addition, all configurations shown in the following embodiments are not necessarily indispensable as a solving means of the invention described in the appended claims.

First Embodiment

Figure 1:
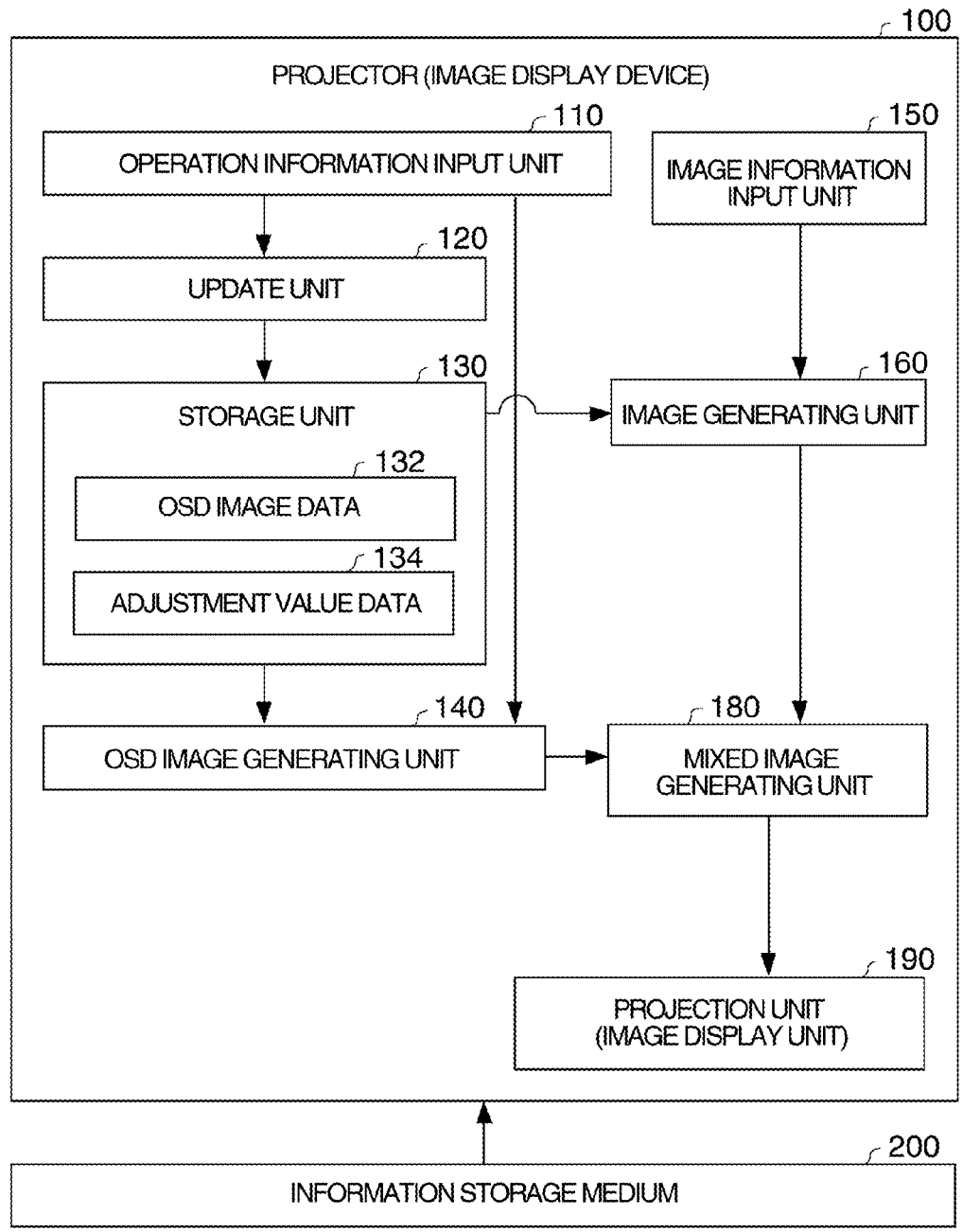
FIG. 1 is a functional block diagram of a projector according to a first embodiment.

FIG. 1 is a functional block diagram of a projector 100 according to a first embodiment. The projector 100 that is an example of an image display device is configured to include: an operation information input unit 110 that inputs operation information; a storage unit 130 that stores OSD image data 132, adjustment value data 134, and the like; an update unit 120 that updates the OSD image data 132 and the like; and an OSD image generating unit 140 that generates a first OSD image with the contents corresponding to operation information on the basis of the OSD image data 132 and the operation information and that generates a second OSD image, which shows a temporary non-display state of the first OSD image, at the time of temporary non-display instruction of the first OSD image.

In addition, the projector 100 is configured to include: an image information input unit 150 that inputs image information from a PC (personal computer) or the like; an image generating unit 160 that generates an original image on the basis of the image information; a mixed image generating unit 180 that generates a mixed image of the original image and a first or second OSD image; and a projection unit 190 that projects the mixed image. In addition, the projection unit 190 functions as an image display unit that displays a mixed image.

Moreover, for example, the following things may be adopted as hardware for realizing the functions of the units in the projector 100. For example, a remote controller, an infrared receiving unit, and an operation button may be adopted for the operation information input unit 110. A CPU or the like may be adopted for the update unit 120. An image processing circuit or the like may be adopted for the OSD image generating unit 140, the image generating unit 160, and the mixed image generating unit 180. A flash memory or the like may be adopted for the storage unit 130. An image input terminal or the like may be adopted for the image information input unit 150. A liquid crystal panel, an optical system such as a lens, a liquid crystal driving circuit, and a lamp may be adopted for the projection unit 190.

Figure 2:
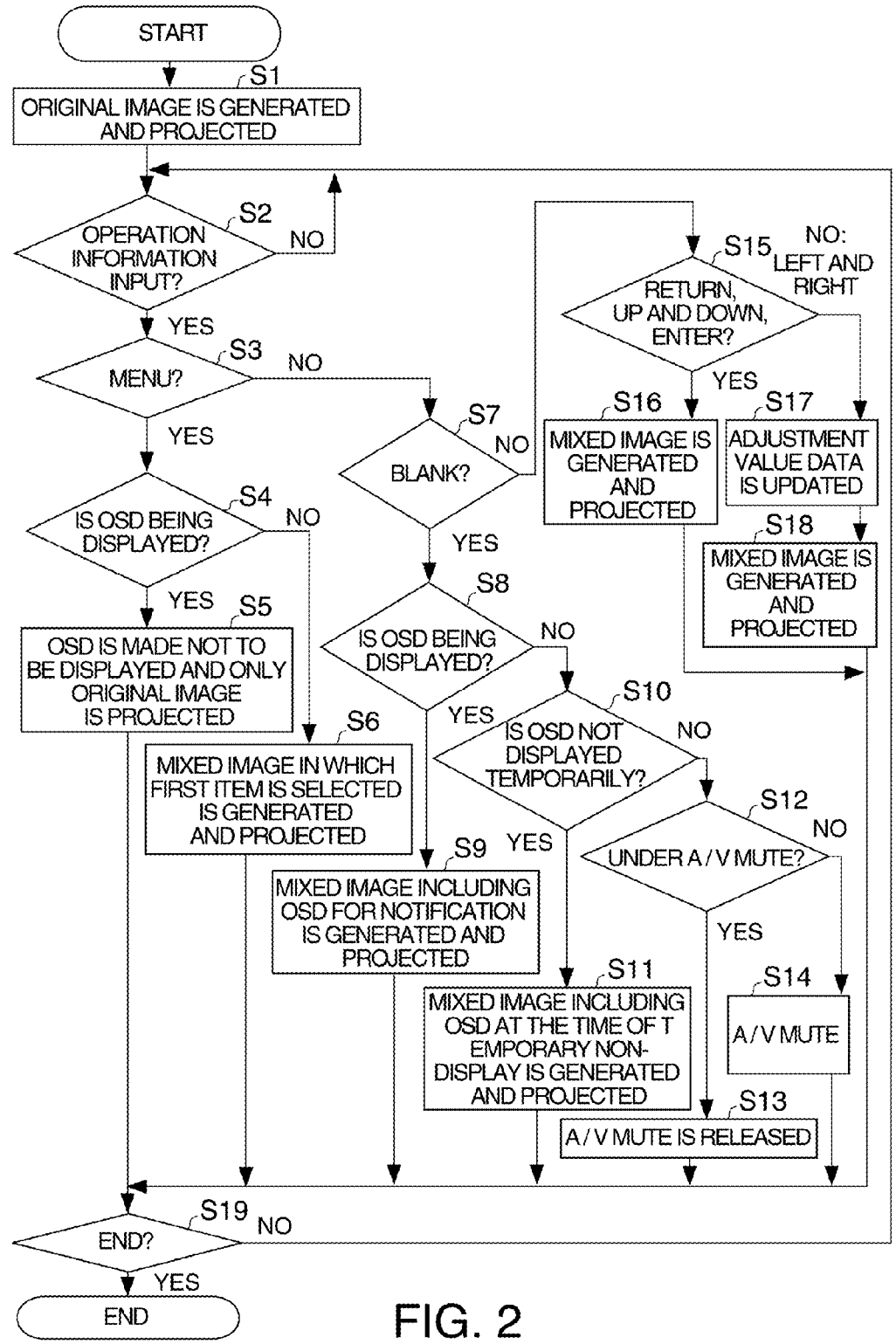
FIG. 2 is a flow chart illustrating a display processing procedure of an OSD image in the first embodiment.

Next, a display processing procedure of an OSD image using the OSD image generating unit 140 and the like will be described. FIG. 2 is a flow chart illustrating a display processing procedure of an OSD image in the first embodiment.

The image information input unit 150 inputs image information (for example, information for displaying a still image or a moving image, such as an RGB signal), the image generating unit 160 generates an original image (image which is not mixed with an OSD image) on the basis of the image information, and the projection unit 190 projects the original image (step S1).

The OSD image generating unit 140 determines whether or not a user has input operation information to the operation information input unit 110 using a remote controller (step S2) and determines the contents of the operation information. The OSD image generating unit 140 determines whether or not the operation information is information indicating that a menu button of the remote controller has been pressed (step S3). In addition, the menu button is a button used to instruct display or non-display of a preference menu image which is a kind of the first OSD image.

When the menu button is pressed, the OSD image generating unit 140 determines whether or not the first OSD image is being displayed (step S4). In addition, the OSD image generating unit 140 may store information indicating a display state of an OSD image therein or may store the information as data in the storage unit 130.

When the preference menu image is not being displayed, the OSD image generating unit 140 generates an OSD image in which a first item is selected on the basis of the OSD image data 132 and the operation information, the mixed image generating unit 180 generates a mixed image by overlapping the OSD image on the original image, and the projection unit 190 projects the mixed image (step S6). In addition, data for generating OSD images with various states is included in the OSD image data 132, and data for generating an OSD image in an initial state (state where a first item is selected) may also be included in the OSD image data 132.

Figure 3:
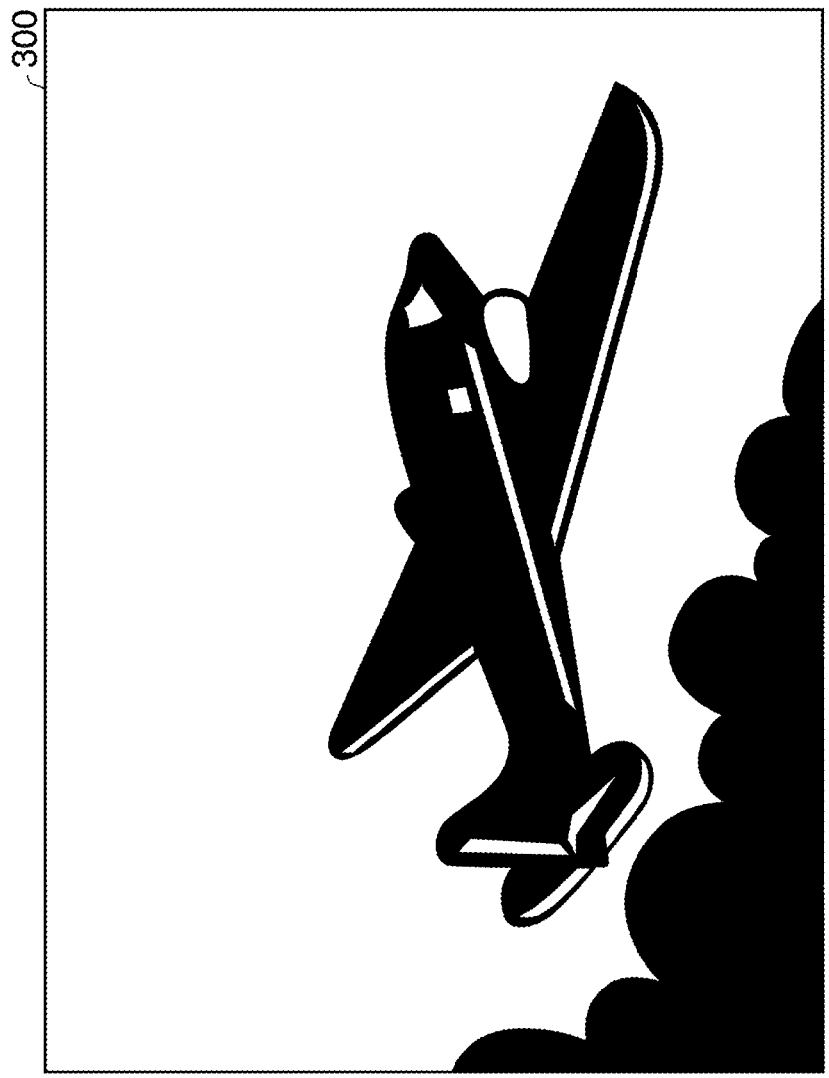
FIG. 3 is a view illustrating an example of an original image in the first embodiment.
Figure 4:
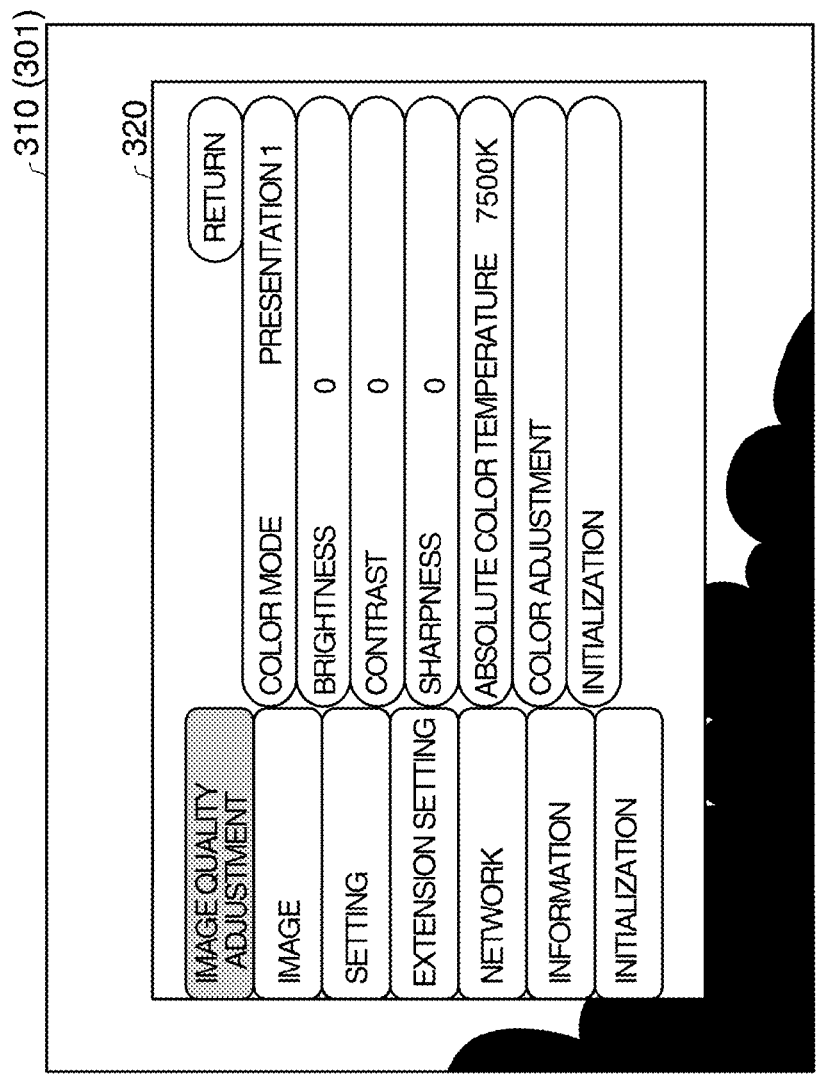
FIG. 4 is a view illustrating an example of a mixed image in the first embodiment.

FIG. 3 is a view illustrating an example of an original image 300 in the first embodiment. In addition, FIG. 4 is a view illustrating an example of a mixed image 310 in the first embodiment. For example, the original image 300 is an image in which an airplane is disposed in the middle, and an OSD image (first OSD image) 320 is disposed in the middle of an original image 301 in the mixed image 310.

In addition, the OSD image 320 is a preference menu image. In the OSD image 320, 'image quality adjustment' for adjusting a color mode and the like, 'image' for performing adjustment of a display position or flicker, 'setting' for performing setting of the volume or the brightness, 'extension setting' for performing setting of an image displayed at the time of no input of image information, 'network' for performing setting of an IP address, 'information' indicating the cumulative usage time of a lamp, an input source, and the like, and 'initialization' for returning all adjustment values to the initial state or returning the cumulative usage time of a lamp to zero are provided as a top menu.

Moreover, when the menu button is pressed while the OSD image 320 is being displayed, the OSD image generating unit 140 stops generation of the OSD image 320 and the projection unit 190 projects only the original image 300 (step S5).

In addition, when the operation information is not information indicating that the menu button has been pressed, the OSD image generating unit 140 determines whether or not the operation information is information indicating that a blank button has been pressed (step S7). Moreover, in the present embodiment, the blank button is a button used to perform an operation for A/V mute (pause of output of image and sound) or an operation for temporary non-display of the OSD image (first OSD image) depending on a situation.

In addition, when the operation information is not information indicating that the blank button has been pressed, the OSD image generating unit 140 determines whether or not the operation information is information indicating that one of a return button, an up button, a down button, and a enter button has been pressed (step S15).

For example, the user may adjust the image quality by pressing the enter button of the remote controller in a state where the mixed image 310 of FIG. 4 is displayed (state where the 'image quality adjustment' is selected). For example, when the enter button is pressed, the OSD image generating unit 140 generates an OSD image corresponding to the state and details of the operation on the basis of the OSD image data 132, the adjustment value data 134, and the operation information, the mixed image generating unit 180 generates a mixed image by overlapping the OSD image on the original image, and the projection unit 190 projects the mixed image (step S16).

Figure 5:
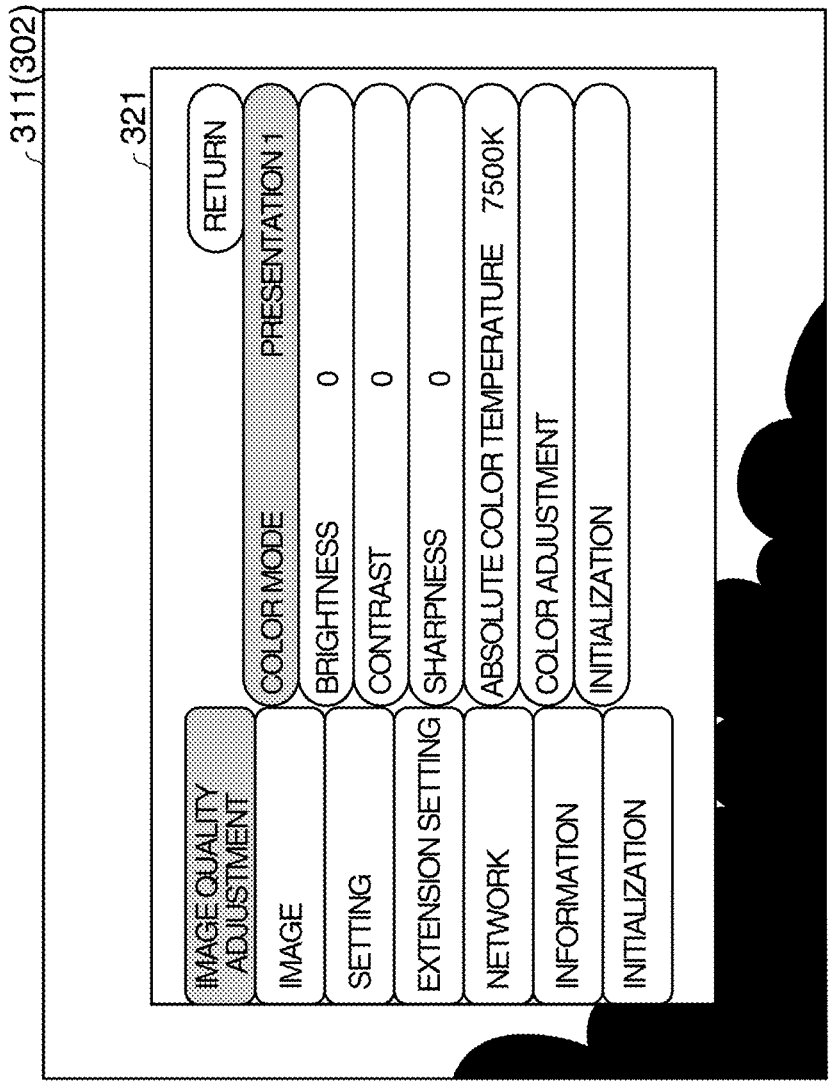
FIG. 5 is a view illustrating another example of a mixed image in the first embodiment.

FIG. 5 is a view illustrating a mixed image 311 which is another example in the first embodiment. For example, when the enter button of the remote controller is pressed in a state where the mixed image 310 of FIG. 4 is displayed, the OSD image generating unit 140 generates an OSD image 321 in which the 'color mode', which is a first item of a submenu of the image quality adjustment, is selected and the projection unit 190 projects the mixed image 311 obtained by overlapping the OSD image 321 on an original image 302.

Figure 6:
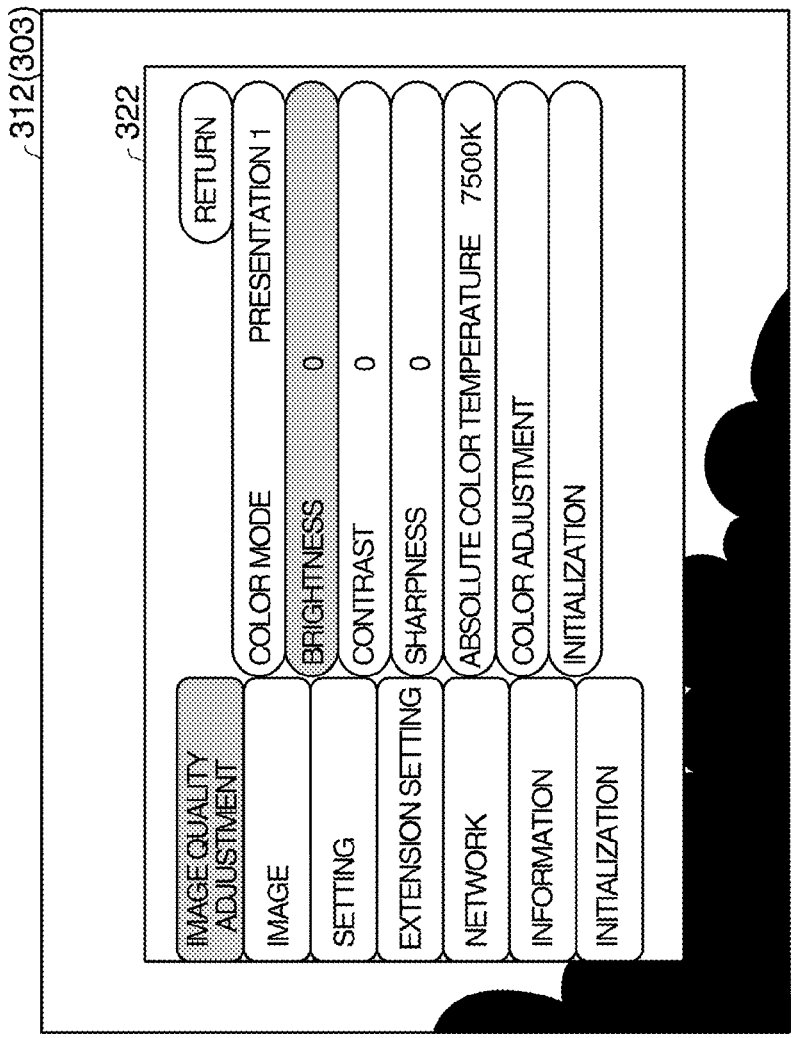
FIG. 6 is a view illustrating still another example of a mixed image in the first embodiment.

The user may select the 'brightness', which is a next item of the submenu, by pressing the down button of the remote controller in a state shown in FIG. 5. FIG. 6 is a view illustrating a mixed image 312 which is still another example in the first embodiment.

For example, when the down button of the remote controller is pressed in a state where the mixed image 311 of FIG. 5 is displayed, the OSD image generating unit 140 generates an OSD image 322 in which the 'brightness', which is a second item of the submenu of the image quality adjustment, is selected and the projection unit 190 projects the mixed image 312 obtained by overlapping the OSD image 322 on an original image 303.

Figure 7:
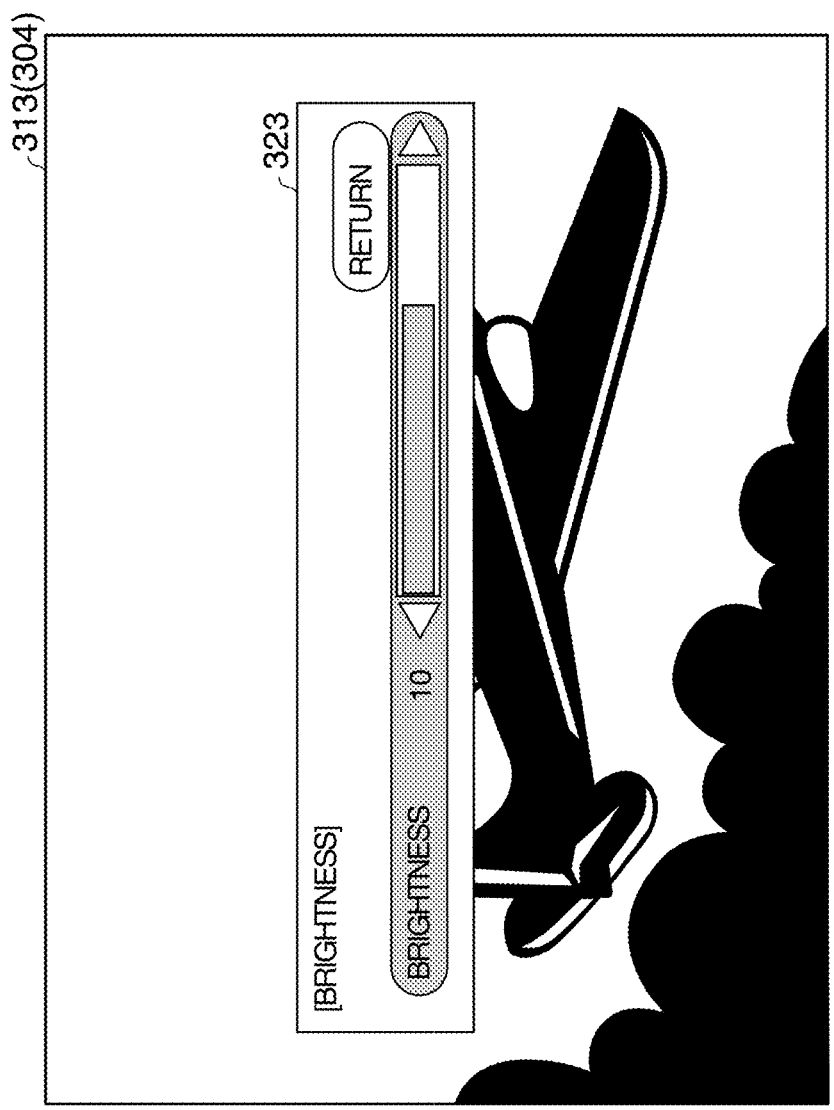
FIG. 7 is a view illustrating still another example of a mixed image in the first embodiment.

FIG. 7 is a view illustrating a mixed image 313 which is still another example in the first embodiment. For example, when the enter button of the remote controller is pressed in a state where the mixed image 312 of FIG. 6 is displayed, the OSD image generating unit 140 generates an OSD image 323 for adjustment of the brightness and the projection unit 190 projects the mixed image 313 obtained by overlapping the OSD image 323 on an original image 304.

The user decreases the adjustment value of the brightness by pressing a left key of the remote controller or increases the adjustment value of the brightness by pressing a right key of the remote controller in a state where the mixed image 313 is displayed. The update unit 120 updates the adjustment value data 134 corresponding to the current selected item and details of the operation when the right key or left key of the remote controller is pressed (step S17).

Moreover, the OSD image generating unit 140 generates the OSD image 323 in which the value of the brightness has been updated on the basis of the OSD image data 132, the adjustment value data 134, and the operation information, the image generating unit 160 generates the original image 304 in which the brightness has been adjusted on the basis of the adjustment value data 134, and the projection unit 190 projects the mixed image 313 obtained by overlapping the OSD image 323 on the original image 304.

For example, in this state, the user presses the blank button of the remote controller in order to check the entire original image 304. When the blank button of the remote controller is pressed, the OSD image generating unit 140 determines whether or not the OSD image 323 is being displayed (step S8). When the OSD image 323 is being displayed, the OSD image generating unit 140 generates an OSD image for notification, which is a second OSD image, instead of the OSD image 323 on the basis of the OSD image data 132.

Figure 8:
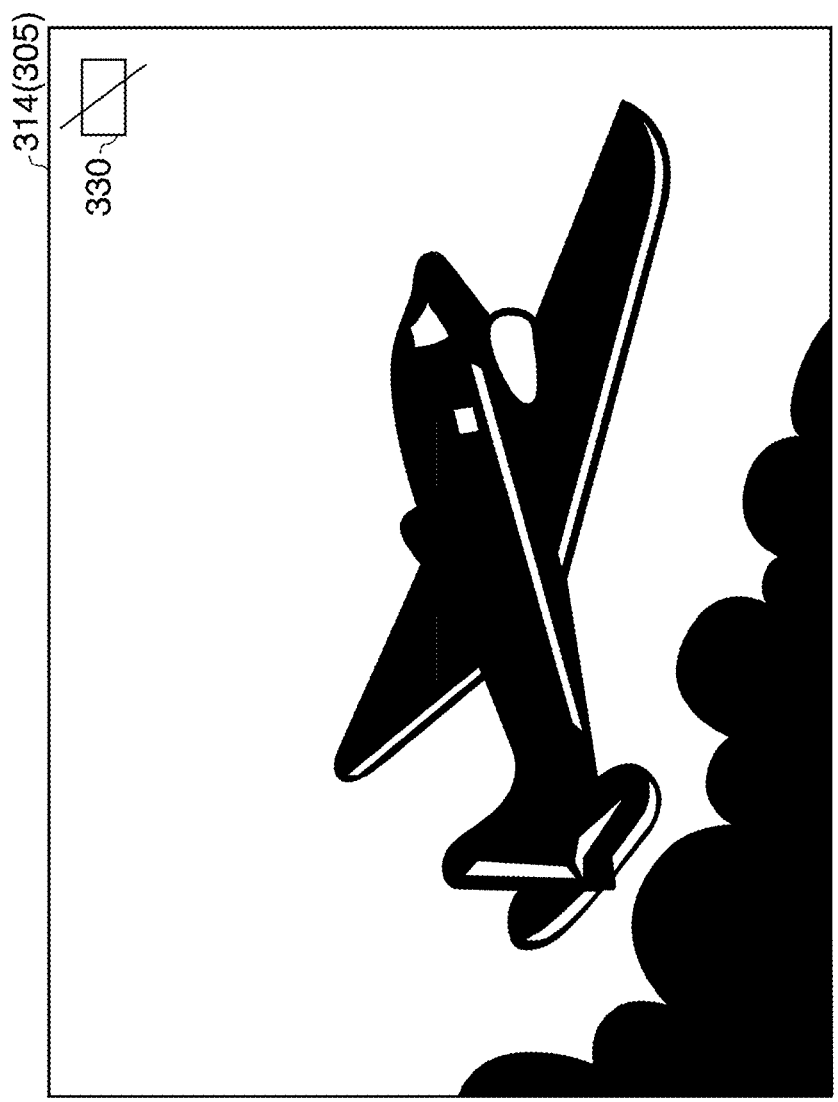
FIG. 8 is a view illustrating still another example of a mixed image in the first embodiment.

FIG. 8 is a view illustrating a mixed image 314 which is still another example in the first embodiment. The mixed image generating unit 180 generates a mixed image 314 by overlapping an OSD image 330, which is an OSD image for notification, on an original image 305 and the projection unit 190 projects the mixed image 314 (step S9).

The OSD image 330 is an image showing that the first OSD image (preference menu image) is in a temporary non-display state and is also an image smaller than the first OSD image. For example, the OSD image 330 is a rectangular image with one oblique line and is displayed small at the upper right side of the mixed image 314.

In addition, if the first OSD image is not being displayed when the blank button of the remote controller has been pressed, the OSD image generating unit 140 determines whether or not the first OSD image is in a temporary non-display state (step S10).

Pressing the blank button during the temporary non-display means a redisplay instruction of the first OSD image. Accordingly, in the case of temporary non-display, the OSD image generating unit 140 generates an OSD image at the time of temporary non-display on the basis of the OSD image data 132 and the like, and the projection unit 190 projects a mixed image obtained by overlapping the OSD image on the original image (step S11).

In addition, the update unit 120 may store data, which indicates a newest state of the first OSD image, in the storage unit 130 or may store data indicating the newest first OSD image in the storage unit 130 as a part of the OSD image data 132. When there is a redisplay instruction of the first OSD image, the OSD image generating unit 140 may generate the first OSD image with the original state on the basis of the data.

For example, by pressing the blank button in the state shown in FIG. 7 so that the state shown in FIG. 7 changes to the state shown in FIG. 8 and then pressing the blank button again, the user may display the OSD image 323 with the state shown in FIG. 7 again.

Moreover, if neither a preference menu image is being displayed nor temporary non-display is performed when the blank button has been pressed, the projector 100 determines whether or not A/V mute is being performed (step S12). When the A/V mute is being performed, the projector 100 executes processing for stopping the A/V mute (step S13). When the A/V mute is not being performed, the projector 100 executes A/V mute processing (step S14).

The projector 100 determines whether to end the processing, for example, by determining whether or not a power button of the remote controller or main body has been pressed (step S19). When the processing is to be ended, the projector 100 ends the processing. When the processing is not to be ended, the projector 100 continues the processing (steps S1 to S19).

As described above, according to the present embodiment, the projector 100 can generate an OSD image with the contents at the time of temporary non-display instruction when there is a redisplay instruction after temporary non-display instruction of a normal OSD image. As a result, the user can perform adjustment and the like of an image using an OSD image more efficiently.

In addition, according to the present embodiment, since the projector 100 generates a second OSD image showing temporary non-display at the time of temporary non-display of a normal OSD image, the user can see that the normal OSD image is in a temporary non-display state. Moreover, since the size of the second OSD image is small, almost the entire original image can be checked.

In addition, according to the present embodiment, at the time of redisplay instruction of a normal OSD image, the user can perform adjustment and the like of an image using an OSD image with a state where a selected item at the time of temporary non-display instruction is selected. As a result, the user can perform adjustment and the like of an image more efficiently.

In addition, according to the present embodiment, when an instruction to end the display of a normal OSD image was made (when an operation of pressing the menu button was performed), the user can perform adjustment and the like of an image using an OSD image with a state where a first item is selected. As a result, the user can perform adjustment and the like of an image more efficiently.

In addition, according to the present embodiment, when the user adjusts an image, the user can adjust the image while checking an original image on which the adjustment is reflected.

In addition, according to the present embodiment, the projector 100 can realize a temporary non-display function of an OSD image without providing a new button in the remote controller by assigning a function of performing temporary non-display to an existing button of the remote controller.

Second Embodiment

Although the display position of an OSD image is in the middle in the first embodiment, the display position of an OSD image may be a position other than the middle or a user may designate the display position of an OSD image. Moreover, although the second OSD image is displayed at the time of non-display of the first OSD image in the first embodiment, only an original image may be displayed at the time of non-display of the first OSD image.

Figure 9:
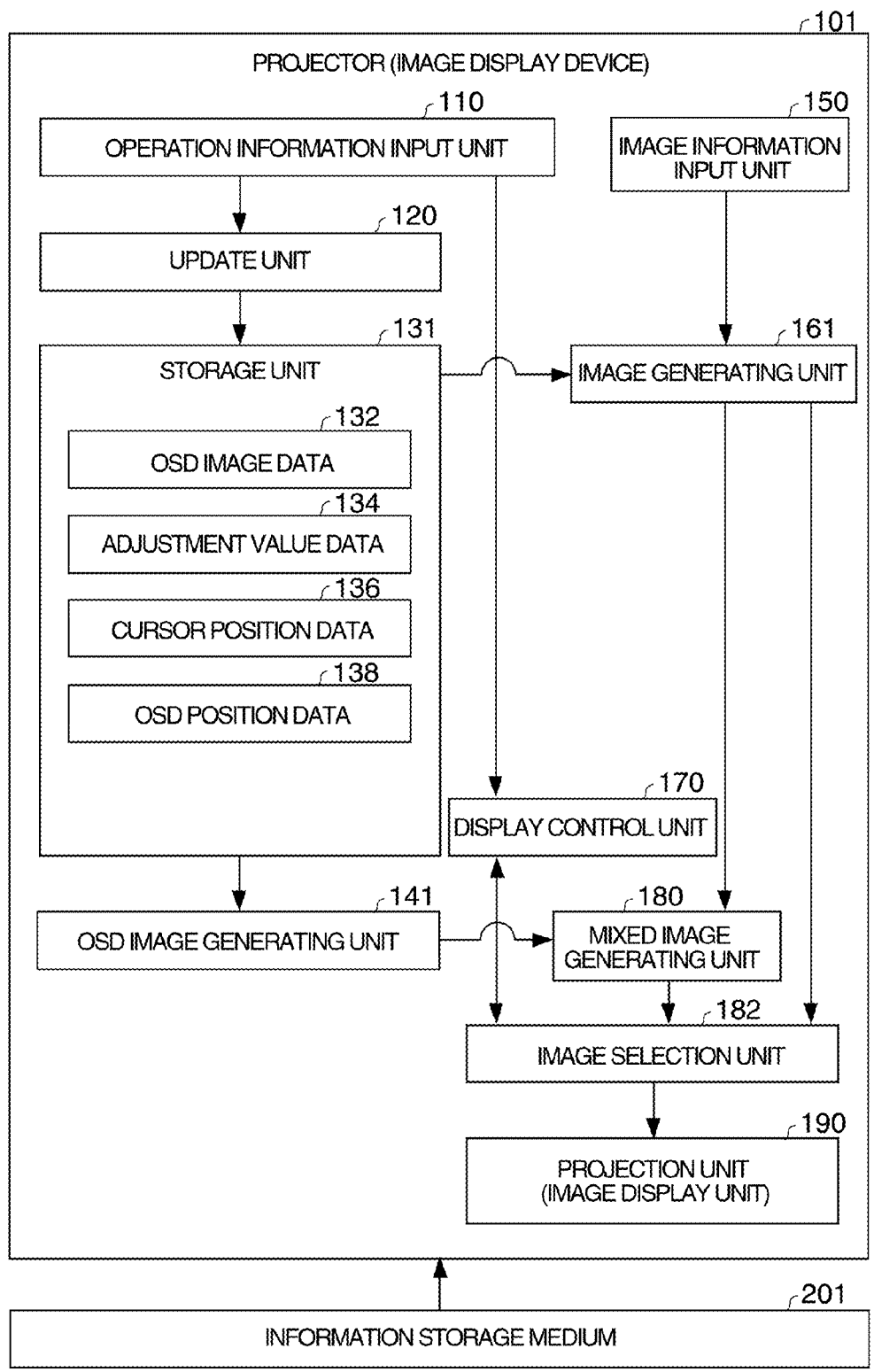
FIG. 9 is a functional block diagram of a projector according to a second embodiment.

FIG. 9 is a functional block diagram of a projector 101 according to a second embodiment. The projector 101 is configured to include an image selection unit 182 that selects a mixed image or an original image and a display control unit 170 that makes the image selection unit 182 select an image in addition to the configuration of the first embodiment.

Moreover, a storage unit 131 stores cursor position data 136 and OSD position data 138 in addition to the OSD image data 132 and the adjustment value data 134. The cursor position data 136 is data indicating a selected item (selected position) in an OSD image, for example. The OSD position data 138 is data indicating the position of an OSD image in a mixed image, for example.

For example, when a user performs an operation of designating an upper left side as a display position of an OSD image, the operation information input unit 110 inputs the operation information and the update unit 120 updates the OSD position data 138 on the basis of the operation information.

Moreover, for example, when the user operates direction buttons, such as a enter button and an up button of the remote controller, in a state where an OSD image is displayed, the update unit 120 updates the cursor position data 136 on the basis of the operation information. In addition, the cursor position data may be data in which first two bits indicate a top menu, next two bits indicate a first stage of a submenu, next two bits indicate a second stage of the submenu, and last two bits indicate a third stage of the submenu, for example, like '01010000' in the case of the OSD image 321 of FIG. 5 and '01020000' in the case of the OSD image 322 of FIG. 6.

Figure 10:
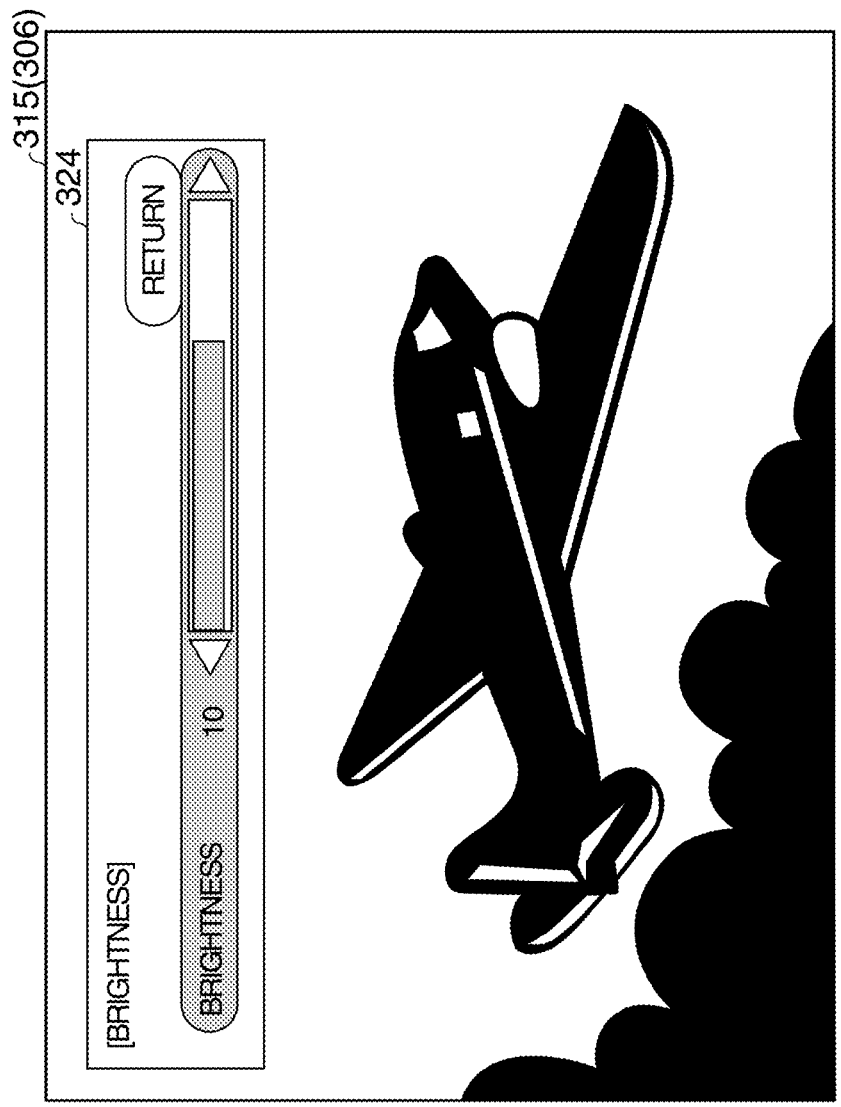
FIG. 10 is a view illustrating an example of a mixed image in the second embodiment.

FIG. 10 is a view illustrating an example of a mixed image 315 in the second embodiment. An OSD image generating unit 141 generates an OSD image 324 on the basis of the OSD image data 132, the adjustment value data 134, the cursor position data 136, and the OSD position data 138. The mixed image generating unit 180 generates a mixed image 315 by mixing an original image 306 generated by an image generating unit 161 with the OSD image 324 generated by the OSD image generating unit 141.

The display control unit 170 makes the image selection unit 182 select the mixed image 315 on the basis of operation information, and the projection unit 190 projects the mixed image 315. In addition, the OSD image 324 is disposed at the upper left position of the mixed image 315.

In addition, when operation information indicating a temporary non-display instruction of an OSD image is input to the operation information input unit 110 in a state where the OSD image 324 is displayed, the display control unit 170 makes the image selection unit 182 select the original image 306 from the image generating unit 161 and the projection unit 190 projects the original image 306 in which the OSD image 324 does not exist.

In addition, when operation information indicating a redisplay instruction of an OSD image is input to the operation information input unit 110 after temporary non-display instruction of the OSD image, the display control unit 170 makes the image selection unit 182 select the mixed image 315 from the mixed image generating unit 180 and the projection unit 190 projects the mixed image 315 in which the OSD image 324 exists.

As described above, according to the present embodiment, the projector 101 can generate the OSD image 324 with the contents at the time of temporary non-display instruction when there is a redisplay instruction after temporary non-display instruction of the normal OSD image 324. As a result, the user can perform adjustment and the like of an image using the OSD image 324 more efficiently.

In addition, according to the present embodiment, the projector 101 does not display the normal OSD image 324 at the time of temporary non-display of the normal OSD image 324, so that the user can check the entire original image 306.

In addition, the OSD image generating unit 141 determines the display position of the OSD image 324 on the basis of the OSD position data 138 indicating the display instruction position of the OSD image 324 and determines, at the time of redisplay instruction, the display position at the time of temporary non-display instruction as a display position of the OSD image 324. Accordingly, when the user performs redisplay of the normal OSD image 324 in order to perform adjustment and the like of an image, the user can display the normal OSD image 324 at the same position as that at the time of temporary non-display. As a result, the user can perform adjustment and the like of an image efficiently.

Other Embodiments

In addition, applications of the invention are not limited to the embodiments described above, but various modifications thereof may also be made. For example, buttons for performing temporary non-display and redisplay of an OSD image may be a common exclusive button or may be different exclusive buttons.

In addition, an OSD image is not limited to the OSD image 320 and the like. For example, an OSD image may include an image (for example, '[blank]: temporary non-display/redisplay') showing details of the operation and explanation on the operation.

In addition, although it is notified that an OSD image is not displayed temporarily using another OSD image in the first embodiment, the projector may notify it using an LED provided in the main body or notify it using sound, for example. In this case, the projector can notify the user that an OSD image is not displayed temporarily while allowing the user to check the entire original image.

In addition, the second OSD image is not limited to the OSD image 330, but an image which is smaller than the first OSD image and has arbitrary color and shape may be used. In addition, the original image is not limited to an image based on image information input by the image information input unit 150. For example, the original image may be an image based on image information stored in the storage units 130 and 131.

In addition, the projectors 100 and 101 are not limited to LCD projectors but may be projectors using the DMD (Digital Micromirror Device), for example. In addition, the 'DMD' is a trademark of Texas Instruments, Inc., USA. In addition, functions of the projectors 100 and 101 may be realized by distributing them to a plurality of apparatuses (for example, a PC, a projector, etc.).

In addition, image display devices to which the invention may be applied are not limited to the projectors 100 and 101 but may be a liquid crystal display, a television, a PDA, an electronic dictionary, a mobile phone, and a portable game device, for example.

What is claimed is:

1. An image display device comprising:
    an image display unit that displays an image;
    an OSD image generating unit that:
        generates a first OSD image with contents corresponding to input operation information on the basis of OSD image data and the operation information,
        generates a second OSD image which shows a temporary non-display state of the first OSD image; and
    a display control unit that makes the image display unit display an original image, a first mixed image generated by mixing the original image and the first OSD image such that the first OSD image overlaps the original image, or a second mixed image generated by mixing the original image and the second OSD image such that the second OSD image replaces the first OSD image and overlaps a portion of the original image, on the basis of the operation information,
    wherein:
        in response to a user input received during display of the first mixed image, the display control unit makes the image display unit display the second mixed image instead of the first mixed image, the user input directing a temporary non-display state of the first OSD image,
        the display control unit makes the image display unit display the first mixed image instead of the second mixed image when operation information indicating a redisplay instruction of the first OSD image is input in a state where the second mixed image is displayed,
        the second OSD image is small enough in relation to the second mixed image area that almost the entire original image is visible in the second mixed image.

2. The image display device according to claim 1, wherein the OSD image generating unit generates the second OSD image instead of the first OSD image when operation information indicating the temporary non-display instruction of the first OSD image is input and generates the first OSD image instead of the second OSD image when operation information indicating the redisplay instruction of the first OSD image is input.

3. The image display device according to claim 1, wherein the OSD image generating unit generates the first OSD image with contents at the time of the temporary non-display instruction of the first OSD image when operation information indicating the redisplay instruction of the first OSD image is input.

4. The image display device according to claim 1, wherein the first OSD image is an image in which at least one item is selectable from a plurality of items,
    when the operation information indicates selection of an item, the OSD image generating unit generates the first OSD image with a state where at least the one item is selected according to the selection, and
    the OSD image generating unit generates the first OSD image with a state where a selected item at the time of the temporary non-display instruction is selected when operation information indicating the redisplay instruction of the first OSD image is input.

5. The image display device according to claim 4, wherein the OSD image generating unit generates the first OSD image with a state where a first item is selected when operation information indicating a display end instruction of the first OSD image is input in a state where the first mixed image is displayed.

6. The image display device according to claim 4, further comprising:
    an update unit that updates adjustment value data indicating an adjustment value of an image on the basis of the operation information,
    wherein an item regarding adjustment of an image is included in a plurality of items of the first OSD image, and
    the image generating unit generates the original image adjusted on the basis of the adjustment value data.

7. The image display device according to claim 1, wherein the OSD image generating unit determines a display position of the first OSD image on the basis of operation information indicating a display instruction position of the first OSD image, and determines a display position at the time of the temporary non-display instruction as the display position of the first OSD image when operation information indicating the redisplay instruction of the first OSD image is input.

8. A projector functioning as the image display device according to claim 1.

9. A control method to control an image display device, the control method comprising the steps of:
    generating a first OSD image with contents corresponding to input operation information on the basis of OSD image data and the operation information;
    generating a second OSD image which shows a temporary non-display state of the first OSD image;
    displaying an original image, a first mixed image generated by mixing the original image and the first OSD image such that the first OSD image overlaps the original image, or a second mixed image generated by mixing the original image and the second OSD image such that the second OSD image replaces the first OSD image and overlaps a portion of the original image, selectively on the basis of the operation information;
    displaying, in response to a user input received during display of the first mixed image, the second mixed image instead of the first mixed image, the user input directing a temporary non-display state of the first OSD image; and
    displaying the first mixed image instead of the second mixed image when operation information indicating a redisplay instruction of the first OSD image is input in a state where the second mixed image is displayed,
    wherein the second OSD image is small enough in relation to the second mixed image area that almost the entire original image is visible in the second mixed image.

10. The control method according to claim 9, further comprising:
    generating the second OSD image instead of the first OSD image when operation information indicating the temporary non-display instruction of the first OSD image is input and generating the first OSD image instead of the second OSD image when operation information indicating the redisplay instruction of the first OSD image is input.

11. A computer program product embodied in a non-transitory computer readable medium and comprising instructions executable by a computer configured to control an image display unit, the instructions executable to perform the function of:

an OSD image generating unit that:
generates a first OSD image with contents corresponding to input operation information on the basis of OSD image data and the operation information,
generates a second OSD image which shows a temporary non-display state of the first OSD image; and a display control unit that makes the image display unit display an original image, a first mixed image generated by mixing the original image and the first OSD image such that the first OSD image overlaps the original image, or a second mixed image generated by mixing the original image and the second OSD image such that the second OSD image replaces the first OSD image and overlaps a portion of the original image, on the basis of the operation information, wherein:
in response to a user input received during display of the first mixed image, the display control unit makes the image display unit display the second mixed image instead of the first mixed image, the user input directing a temporary non-display state of the first OSD image,
the display control unit makes the image display unit display the first mixed image instead of the second mixed image when operation information indicating a redisplay instruction of the first OSD image is input in a state where the second mixed image is displayed,
the second OSD image is small enough in relation to the second mixed image area that almost the entire original image is visible in the second mixed image.

12. A computer program product according to claim 11, wherein
the OSD image generating unit generates the second OSD image instead of the first OSD image when operation information indicating the temporary non-display instruction of the first OSD image is input and generates the first OSD image instead of the second OSD image when operation information indicating the redisplay instruction of the first OSD image is input.

13. The image display device according to claim 1, wherein the second OSD image is displayed at a specified location in the second mixed image.

14. The image display device according to claim 1, wherein the second OSD image provides visual notification that the first OSD image is in a temporary non-display state.

15. The image display device according to claim 1, wherein the second OSD image is smaller than the first OSD image.

* * * * *